United States Patent
Komoda et al.

(10) Patent No.: US 6,882,085 B2
(45) Date of Patent: Apr. 19, 2005

(54) ULTRASONIC MOTOR HAVING SECURING PROJECTIONS

(75) Inventors: Masahiko Komoda, Toyokawa (JP); Motoyasu Yano, Kosai (JP); Yukihir Matsushita, Hamakita (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 0 days.

(21) Appl. No.: 10/752,590

(22) Filed: Jan. 8, 2004

(65) Prior Publication Data

US 2004/0145275 A1 Jul. 29, 2004

(30) Foreign Application Priority Data

Jan. 23, 2003  (JP) ......................... 2003-014905

(51) Int. Cl.⁷ ............................................. H01L 41/08
(52) U.S. Cl. .............................. 310/323.12; 310/323.02
(58) Field of Search ...................... 310/323.02, 323.12, 310/323.16

(56) References Cited

U.S. PATENT DOCUMENTS

| | | | |
|---|---|---|---|
| 6,018,213 A | | 1/2000 | Yano |
| 6,300,705 B1 | * | 10/2001 | Komoda et al. ....... 310/323.12 |
| 6,366,004 B1 | * | 4/2002 | Yano et al. ........... 310/323.12 |
| 6,469,419 B1 | * | 10/2002 | Kato et al. ............ 310/323.02 |
| 6,509,673 B1 | * | 1/2003 | Komoda ................ 310/323.12 |
| 2003/0052574 A1 | | 3/2003 | Matsushita et al. |

FOREIGN PATENT DOCUMENTS

| JP | A-2003-88146 | 3/2003 |
|---|---|---|
| JP | A-2003-111452 | 4/2003 |
| JP | A-2003-111454 | 4/2003 |

* cited by examiner

*Primary Examiner*—Mark Budd
(74) *Attorney, Agent, or Firm*—Posz & Bethards, PLC

(57) ABSTRACT

A lower metal block of a stator includes a plurality of securing projections, which engage with an external member and are arranged in an outer peripheral surface of the lower metal block at generally equal angular intervals. Each securing projection is circumferentially located between corresponding two of slits of the lower metal block and has first and second axial ends, which are opposed to one another in a direction generally parallel to the axial direction of the stator and are oriented toward first and second axial ends, respectively, of the stator. The first axial end of each securing projection is axially positioned within an axial extent of the slits, which is measured in the axial direction of the stator.

10 Claims, 6 Drawing Sheets

ULTRASONIC MOTOR HAVING SECURING PROJECTIONS

CROSS REFERENCE TO RELATED APPLICATION

This application is based on and incorporates herein by reference Japanese Patent Application No. 2003-14905 filed on Jan. 23, 2003.

BACKGROUND OF THE INVENTION

1. Field of the Invention

The present invention relates to an ultrasonic motor.

2. Description of Related Art

Various Langevin type ultrasonic motors, each of which has a generally cylindrical shape and generates a standing wave, have been known. Such an ultrasonic motor is disclosed in, for example, U.S. Pat. No. 6,018,213 (corresponding to Japanese Unexamined Patent Publication No. 11-155288), the contents of which are incorporated herein by reference. The disclosed ultrasonic motor includes a cylindrical stator and a cylindrical rotor. The stator includes a plurality of metal blocks and two piezoelectric elements held between corresponding two of the metal blocks. These metal blocks and the piezoelectric elements are held together by a bolt inserted through the metal blocks and the piezoelectric elements in an axial direction of the stator. One of the metal blocks below the piezoelectric elements has slits, which are arranged in an outer peripheral surface of the metal block at equal intervals to convert a longitudinal vibration generated by the piezoelectric elements into a torsional vibration. The rotor is slidably and rotatably urged against a top end surface of the stator, i.e., a top end surface of the uppermost metal block by an urging mechanism.

In the disclosed ultrasonic motor, when a high frequency voltage is applied to the piezoelectric elements, a longitudinal vibration is generated by the piezoelectric elements, and a corresponding torsional vibration is generated by the slits in response to the longitudinal vibration. With these vibrations, the rotor is rotated relative to the stator.

In the above disclosed ultrasonic motor, an annular flange-like securing projection is formed in the lowermost metal block located below the above-described slits to secure the stator and the rotor to an external member, such as a motor case. When the ultrasonic motor is driven, the above described securing projection tends to vibrate substantially. Specifically, in an experiment, when a lower end (a lower end surface) of the stator (the lowermost metal block) is placed over a flat plate, and the ultrasonic motor is driven in this state, the securing projection tends to vibrate substantially (more specifically, a lower end surface of the securing projection vibrates at a relatively high vibration velocity). When the securing projection is secured to the external member, such as the motor case, and the ultrasonic motor is driven, a large vibration is conducted from the securing projection to the external member, such as the motor case, and/or the longitudinal vibration and the torsional vibration of the stator may be adversely affected by the vibration of the securing projection. This will cause deterioration of the performance (e.g., causing fluctuations in a resistivity or a rotational speed) of the ultrasonic motor.

SUMMARY OF THE INVENTION

The present invention addresses the above disadvantages. Thus, it is an objective of the present invention to provide an ultrasonic motor capable of minimizing a vibration of a securing projection of the ultrasonic motor.

To achieve the objective of the present invention, there is provided an ultrasonic motor that includes a generally cylindrical stator and a generally cylindrical rotor. The stator has first and second axial ends and includes at least one piezoelectric element and a plurality of metal blocks. The at least one piezoelectric element generates a longitudinal vibration upon application of a high frequency voltage to the at least one piezoelectric element. The metal blocks are connected to the at least one piezoelectric element. One of the metal blocks includes a plurality of vibration converting portions and a plurality of securing projections. The vibration converting portions generate a torsional vibration in response to the longitudinal vibration and are arranged in an outer peripheral surface of the one of the metal blocks at generally equal angular intervals. Each vibration converting portion has first and second axial ends, which are opposed to one another in a direction generally parallel to an axial direction of the stator and are oriented toward the first and second axial ends, respectively, of the stator. The securing projections engage with an external member and are arranged in the outer peripheral surface of the one of the metal blocks at generally equal angular intervals. Each securing projection is circumferentially located between corresponding two of the vibration converting portions and has first and second axial ends, which are opposed to one another in a direction generally parallel to the axial direction of the stator and are oriented toward the first and second axial ends, respectively, of the stator. The first axial end of each securing projection is axially positioned within an axial extent of the vibration converting portions, which is measured in the axial direction of the stator, in such a manner that the first axial end of the securing projection is axially spaced away from one axial end of the axial extent of the vibration converting portions, at which the second axial ends of the vibration converting portions are located. The rotor is slidably and rotatably urged against the stator. The rotor is rotated upon application of the longitudinal vibration and the torsional vibration to the rotor.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
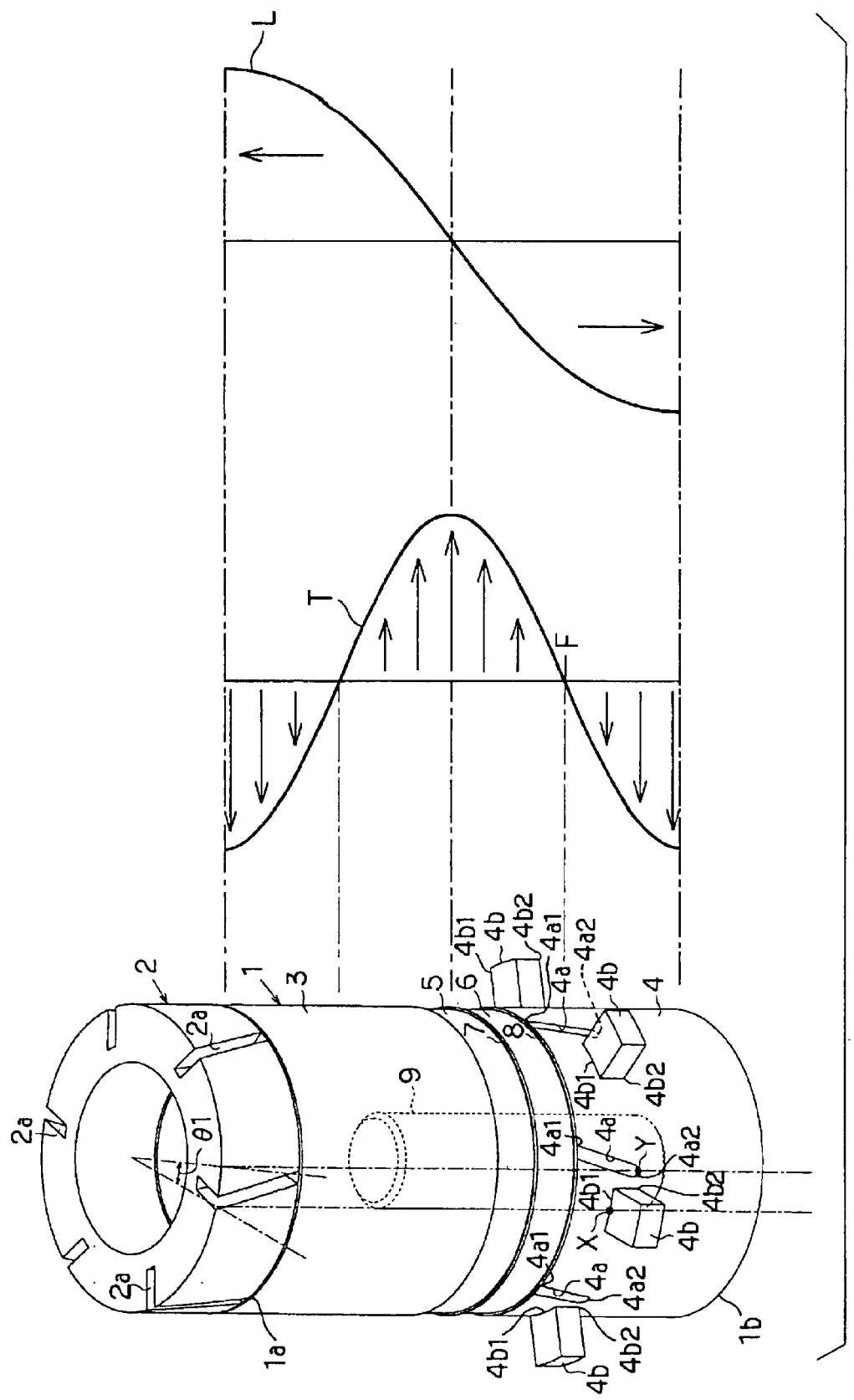
FIG. 1 is a schematic view showing an ultrasonic motor according to an embodiment of the present invention together with a waveform of a torsional vibration and a waveform of a longitudinal vibration.
Figure 2:
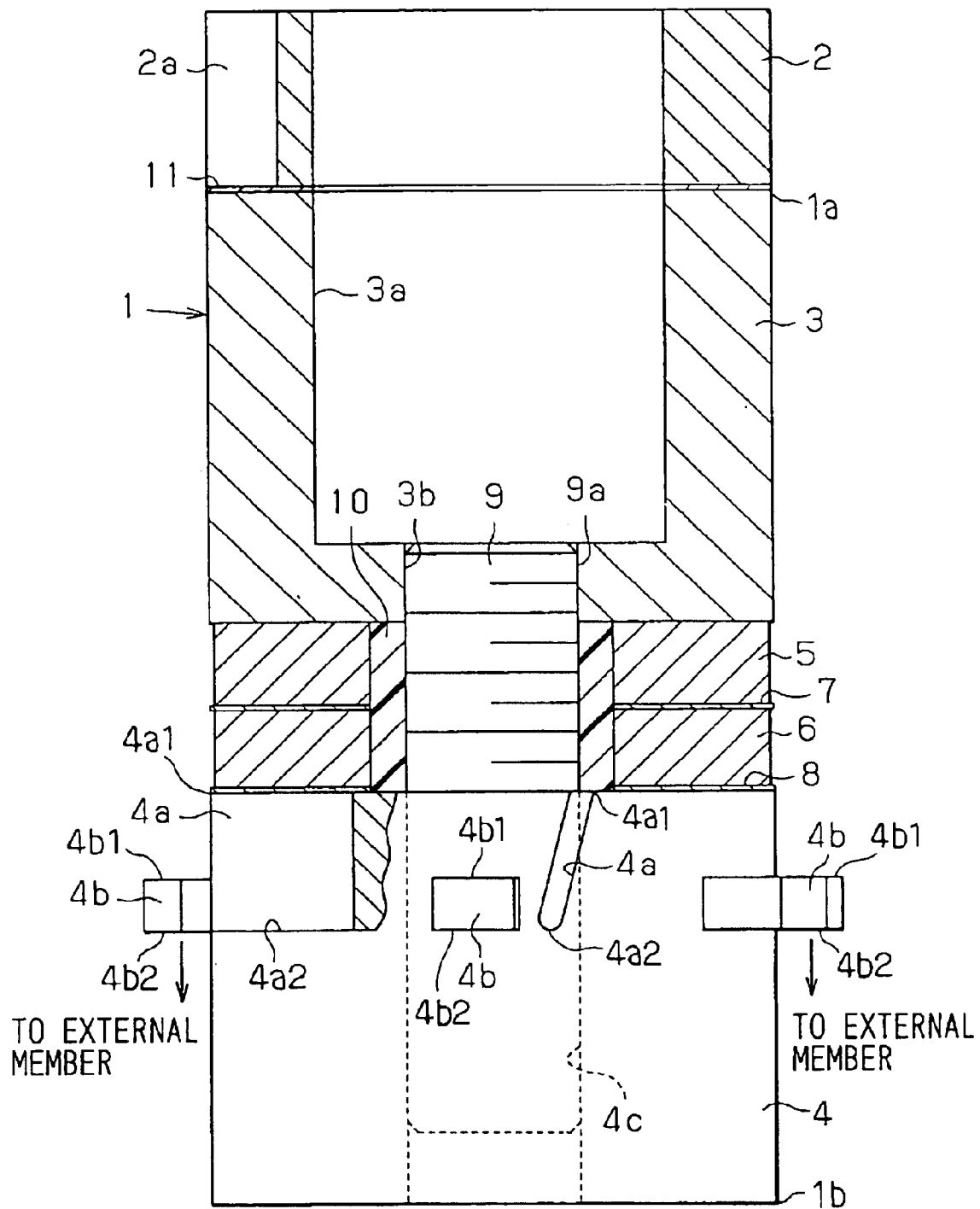
FIG. 2 is a schematic enlarged fragmented cross sectional view of the ultrasonic motor shown in FIG. 1.

An ultrasonic motor according to an embodiment of the present invention will be described with reference to FIGS. 1–8. As shown in FIGS. 1 and 2, the ultrasonic motor includes a stator 1 and a rotor 2. The stator 1 has a top end (first axial end) 1a and a lower end (second axial end) 1b. Furthermore, the stator 1 includes an upper metal block 3, a lower metal block 4, a first piezoelectric element 5, a second piezoelectric element 6, a first electrode plate 7, a second electrode plate 8, a bolt (a fastening member) 9 and a dielectric collar 10.

Each of the upper metal block 3 and the lower metal block 4 is made of a conductive metal material, which is an aluminum alloy in this embodiment. The upper metal block 3 is formed into a generally cylindrical shape. A horn portion 3a, which has an increased inner diameter to amplify a vibration in a top end surface of the upper metal block 3, is formed in a top part of the upper metal block 3. A female thread 3b is formed in an inner peripheral surface of the upper metal block 3 except the horn portion 3a. A thin friction material 11 is bonded to the top end surface of the upper metal block 3.

The lower metal block 4 is formed into a generally cylindrical shape, which has an inner diameter and an outer diameter similar to the inner diameter and the outer diameter of the upper metal block 3 other than the horn portion 3a. A plurality of slits (recesses) 4a is formed in a top part (a top part in FIGS. 1 and 2) of an outer peripheral surface of the lower metal block 4. The slits 4a serve as vibration converting portions, which are recessed radially inward in the outer peripheral surface of the lower metal block 4 and generate a torsional vibration (having a wave, i.e., a waveform T shown in FIG. 1) in response to a longitudinal vibration (having a wave, i.e., a waveform L shown in FIG. 1) generated from the piezoelectric elements 5, 6 upon application of a high frequency voltage to the piezoelectric elements 5, 6. The slits 4a are arranged at generally equal angular intervals (in the present embodiment, six slits 4a are arranged at 60 degree intervals) in the outer peripheral surface of the lower metal block 4 in the circumferential direction. Furthermore, each slit 4a is tilted relative a direction that is parallel to an axial direction of the stator 1. In the present embodiment, a top end (first axial end) 4a1 and a lower end (second axial end) 4a2 of each slit 4a are opposed to one another in a direction generally parallel to the axial direction of the stator 1 and are oriented toward the top end 1a and the lower end 1b, respectively, of the stator 1. The lower axial end 4a2 of each slit 4a is circumferentially displaced from an upper axial end 4a1 of the same slit 4a in a clockwise direction in FIG. 1.

A plurality of securing projections 4b is arranged in the outer peripheral surface of the lower metal block 4 at an axial intermediate location of the lower metal block 4 where a node F of the wave, i.e., the waveform T of the torsional vibration (FIG. 1) is formed. By positioning the securing projections 4b at the node of the wave of the torsional vibration, a vibration of each securing projection 4b is minimized. Also, the securing projections 4b are arranged at generally equal angular intervals in the circumferential direction and project radially outward to secure the lower metal block 4 to an external member, such as an undepicted motor case. Detail of the securing projections 4b will be described later. Each securing projection 4b has a top end (first axial end) 4b1 and a lower axial end (second axial end) 4b2, which are opposed to one another in a direction generally parallel to the axial direction of the stator 1 and are oriented toward the top end 1a and the lower end 1b, respectively, of the stator 1.

A female thread 4c is formed in an inner peripheral surface (indicated by dotted lines in FIG. 2) of the lower metal block 4.

Each of the first and second piezoelectric elements 5, 6 is formed into an annular disk shape and has a through hole that axially penetrates through the center of the piezoelectric element 5, 6. An inner diameter of each of the first and second piezoelectric elements 5, 6 is greater than the inner diameter of the upper metal block 3 and of the lower metal block 4.

Each of the first and second electrode plates 7, 8 is formed into an annular disk shape and has a through hole that penetrates through the center of the electrode plate 7, 8. An inner diameter of the first and second electrode plates 7, 8 is substantially the same as the inner diameter of the first and second piezoelectric elements 5, 6.

The bolt 9 is formed into a generally cylindrical shape and has a male thread 9a in an outer peripheral surface of the bolt 9. The bolt 9 (the male thread 9a) is threadably engageable with the female threads 3b, 4c.

The dielectric collar 10 is made of a dielectric resin material and is formed into a generally annular cylindrical shape. An outer diameter of the dielectric collar 10 is substantially the same as the inner diameter of the first and second piezoelectric elements 5, 6 and of the first and second electrode plates 7, 8. An inner diameter of the dielectric collar 10 is substantially the same as or slightly greater than an outer diameter of the male thread 9a of the bolt 9 to receive the bolt 9 therethrough.

The upper metal block 3 and the lower metal block 4, which sandwich the first and second piezoelectric elements 5, 6 and the first and second electrode plates 7, 8 therebetween, are fastened together by the bolt 9. More specifically, the lower metal block 4, the second electrode plate 8, the second piezoelectric element 6, the first electrode plate 7, the first piezoelectric element 5 and the upper metal block 3 are stacked in this order and are fastened together when the bolt 9 (the male thread 9a) is threadably engaged with the female thread 3b of the upper metal block 3 and the female thread 4c of the lower metal block 4. At this time, the first piezoelectric element 5 and the second piezoelectric element 6 are stacked in such a manner that a polarization direction of the first piezoelectric element 5 is opposite from a polarization direction of the second piezoelectric element 6 in the vertical direction. Furthermore, the dielectric collar 10 is placed between the outer peripheral surface of the male thread 9a of the bolt 9 and the inner peripheral surfaces of the first and second piezoelectric elements 5, 6 and of the first and second electrode plates 7, 8. Thus, the outer peripheral surface of the bolt 9 is electrically insulated from the inner peripheral surfaces of the first and second piezoelectric elements 5, 6 and of the first and second electrode plates 7, 8. Also, at this stage, the second electrode plate 8 is electrically connected to the upper metal block 3 through the lower metal block 4 and the bolt 9.

The rotor 2 is formed into a generally cylindrical shape and has an outer diameter, which is substantially the same as the outer diameter of the upper metal block 3 and the outer diameter of the lower metal block 4. Furthermore, the rotor 2 is slidably and rotatably urged against a top end surface of the stator 1, i.e., against the top end surface of the upper metal block 3 (the friction material 11) by an urging mechanism (not shown). A plurality of rotor slits (recesses) 2a is formed in an outer peripheral surface of the rotor 2, as shown in FIG. 1. The rotor slits 2a are arranged at generally equal angular intervals in a circumferential direction of the rotor 2 and generate a torsional vibration in response to the longitudinal vibration generated by the piezoelectric elements 5, 6. Each rotor slit 2a is tilted relative to a direction that is parallel to an axial direction of the rotor 2 in such a manner that an lower axial end of the rotor slit 2a is circumferentially displaced from a top axial end of the rotor slit 2a in a counterclockwise direction in FIG. 1. That is, each rotor slit 2a is tilted in a direction opposite from that of each slit 4a of the stator 1.

In a stator main rotational mode of the thus constructed ultrasonic motor, a first high frequency voltage, which has a first resonance frequency f1 (e.g., 64 kHz), is applied between the first electrode plate 7 and the second electrode plate 8, so that the longitudinal vibration is generated by the first and second piezoelectric elements 5, 6. Then, the torsional vibration is generated by the slits 4a of the stator 1 in response to the longitudinal vibration. At this time, a vibration in the top end surface of the stator 1, i.e., in the top end surface of the upper metal block 3 (the friction material 11) becomes a complex vibration, which is formed by a combination of the longitudinal vibration and the relatively large torsional vibration. Thus, the rotor 2 rotates in one direction (first rotational direction) with a first rotational characteristic in the stator main rotational mode due to lift force exerted by the longitudinal vibration component of the stator 1 and propelling rotational force exerted by the torsional vibration component.

In a rotor main rotational mode, a second high frequency voltage, which has a second resonance frequency f2 (e.g., 67 kHz), is applied between the first electrode plate 7 and the second electrode plate 8, so that the longitudinal vibration is generated by the first and second piezoelectric elements 5, 6. Then, the torsional vibration is generated by the slits 4a of the stator 1 in response to the longitudinal vibration. At this time, the vibration in the top end surface of the stator 1, i.e., in the top end surface of the upper metal block 3 (the friction material 11) becomes a complex vibration, which is formed by a combination of the longitudinal vibration and the relatively small torsional vibration that is skewed in a direction opposite from that of the above torsional vibration generated in the stator main rotational mode. One of eigenfrequencies (resonance frequencies) of the rotor 2 is set to coincide with the second resonance frequency f2. Therefore, in the rotor 2, the relatively large torsional vibration is generated by the rotor slits 2a through resonation of the rotor 2 based on the longitudinal vibration of the stator 1. At this time, the torsional vibration generated by the rotor slits 2a causes rotation of the rotor 2 in an opposite rotational direction (second rotational direction), which is opposite from the rotational direction of the rotor 2 in the stator main rotational mode. Thus, the rotor 2 is rotated in the opposite direction with a second rotational characteristic in the rotor main rotational mode due to lift force exerted by the longitudinal vibration component of the stator 1 and propelling rotational force exerted by the torsional vibration component of the stator 1 and the torsional vibration component of the rotor 2.

Next, the securing projections 4b will be described in greater detail. Eigenfrequencies (resonance frequencies) of each securing projection 4b are out of a drive frequency range of the high frequency voltage applied to the piezoelectric elements 5, 6 to drive the rotor 2. The drive frequency range includes a frequency range from the first resonance frequency f1 (64 kHz) to the second resonance frequency f2 (67 kHz). The drive frequency range also includes a variation range of the first resonance frequency (i.e., the drive frequency for driving the rotor 2 in the first rotational direction) and a variation range of the second resonance frequency (i.e., the drive frequency for driving the rotor 2 in the second rotational direction), both of which vary depending on manufacturing factors, environmental factors or the like (e.g., manufacturing variations or temperature variations). In the present embodiment, the drive frequency range is set to include a range of 60–70 kHz. Thus, a shape (e.g., a circumferential width or an axial height) of each securing projection 4b of the present embodiment is selected such that the eigenfrequencies (resonance frequencies) of the securing projection 4b do not fall in the range of 60–70 kHz.

Each securing projection 4b is circumferentially positioned between corresponding two of the slits 4a. Furthermore, the top end 4b1 of each securing projection 4b is placed above the lower end 4a2 of the slits 4a. In other words, the top end 4b1 of the securing projection 4b is axially positioned within an axial extent of the vibration converting portions 4a, which is measured in the axial direction of the stator 1, in such a manner that the top end 4b1 of the securing projection 4b is axially spaced away from a lower axial end of the axial extent of the slits 4a, at which the lower ends 4a2 of the slits 4a are located. Each securing projection 4b is circumferentially closer to the lower end 4a2 of the closer one of the corresponding two of the slits 4a than the top end 4a1 of the closer one of the corresponding two of the slits 4a. More specifically, as shown in FIG. 1, a circumferential center point X of each securing projection 4b of the present embodiment is circumferentially displaced by 15 degrees ($\theta 1$) from a circumferential center Y of the lower end 4a2 of the corresponding slit 4a, which is closest to the securing projection 4b, in the counterclockwise direction in FIG. 1. Furthermore, as shown in FIG. 2, the lower end 4b2 of each securing projection 4b of the present embodiment is positioned generally at the same height as the lower end 4a2 of the corresponding slit 4a.

Next, results of various experiments for determining a relationship between a position of each securing projection 4b relative to the corresponding slit 4a and a vibration velocity will be described.

Figure 3:
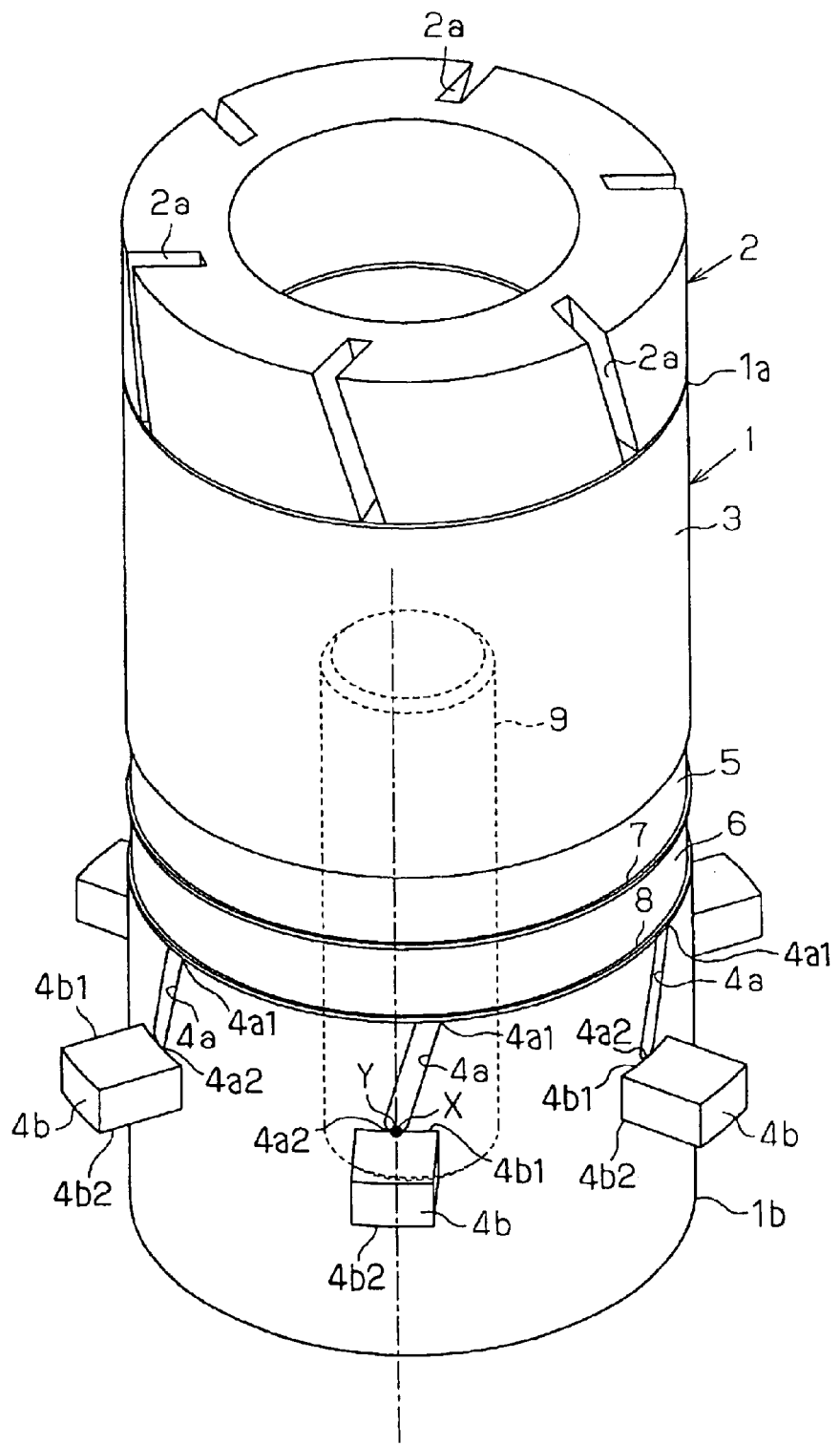
FIG. 3 is a schematic enlarged perspective view of an exemplary ultrasonic motor, showing one illustrative position of each securing projection.
Figure 4:
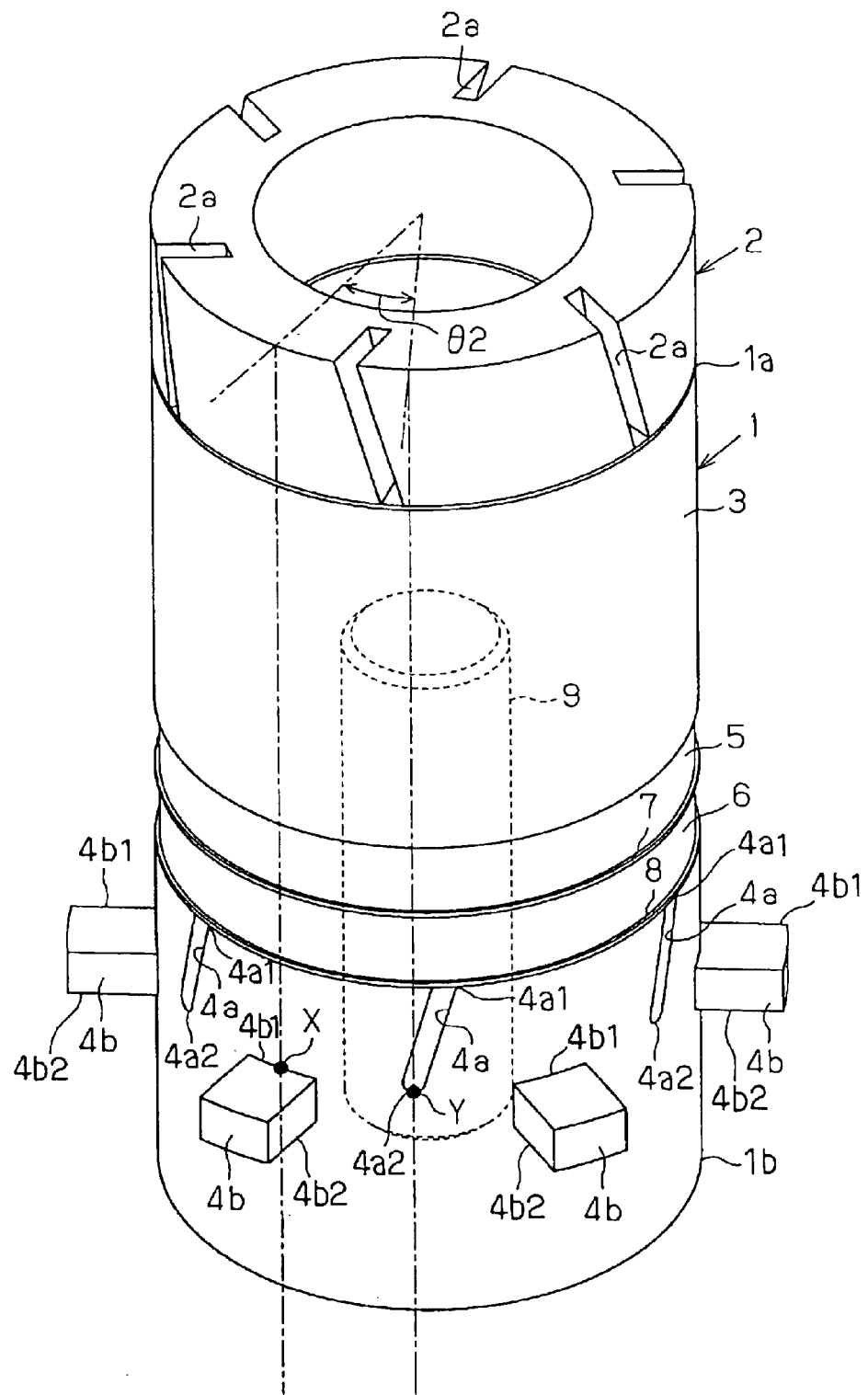
FIG. 4 is a schematic enlarged perspective view of another exemplary ultrasonic motor, showing another illustrative position of each securing projection.

First, results of various experiments for determining a relationship between a circumferential position (angle) of each securing projection 4b relative to the corresponding slit 4a and a corresponding vibration velocity will be described with reference to FIGS. 3–6. Here, it should be noted that the circumferential position (angle) of the securing projection 4b is an angle of deviation of the circumferential center point X of the securing projection 4b from the circumferential center point Y of the lower end 4a2 of the corresponding slit 4a in the clockwise direction in FIG. 1. To illustrate a reference circumferential position of each securing projection 4b used in each experiment, FIG. 3 shows an exemplary ultrasonic motor, in which the center point X of the securing projection 4b coincides with the center point Y of the lower end 4a2 of the corresponding slit 4a in the circumferential direction, so that the securing projection 4b is placed in the reference circumferential position, i.e., in a reference angle (zero degree). To illustrate one circumferential position of each securing projection 4b, FIG. 4 shows an exemplary ultrasonic motor, in which the center point X of the securing projection 4b is displaced by 30 degrees (θ2) from the center point Y of the lower end 4a2 of the slit 4a in the clockwise direction. Furthermore, it should be understood that the following experimental results are obtained while the top end 4b1 of the securing projection 4b is located in the same height as the lower end 4a2 of the slit 4a (FIGS. 3 and 4).

Figure 5:
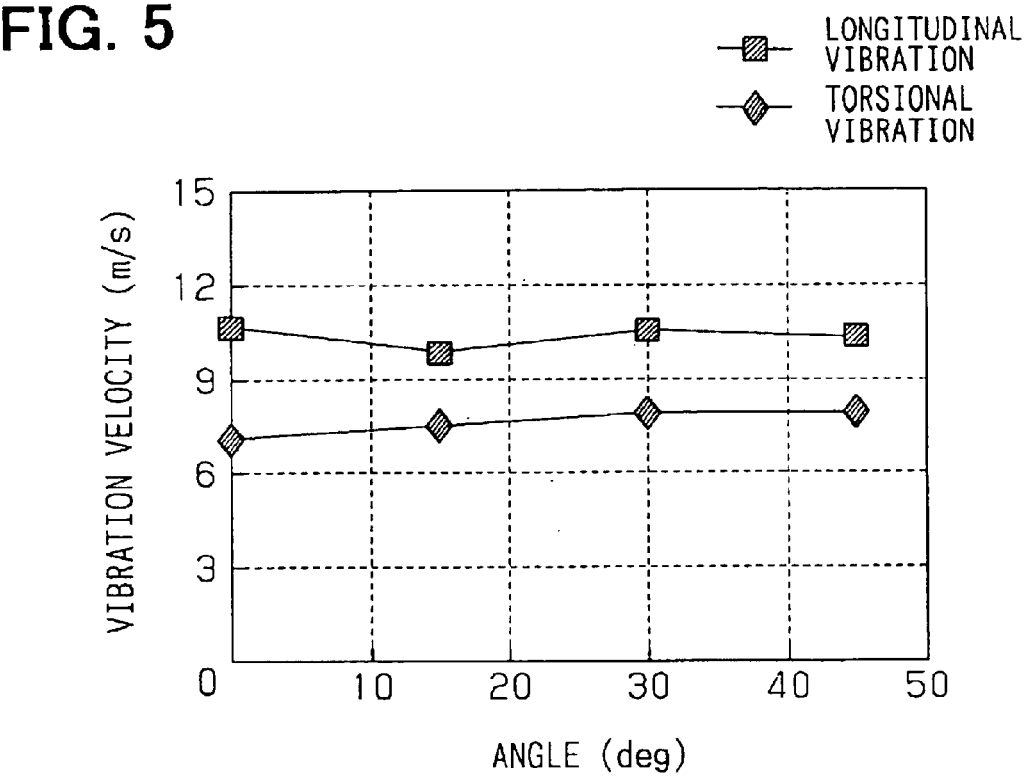
FIG. 5 is a graph showing a relationship between a circumferential position of a securing projection relative to a corresponding slit and a vibration velocity measured in a top end surface of a stator of the ultrasonic motor.

FIG. 5 shows a result of an experiment for determining a relationship between a circumferential position (angle) of each securing projection 4b relative to the corresponding slit 4a and a corresponding vibration velocity measured in the top end surface of the stator 1 (more specifically, measured in a contact surface of the stator 1, which contacts with the rotor 2). AS shown in FIG. 5, the longitudinal vibration of a generally constant vibration velocity and the torsional vibration of a generally constant vibration velocity are generated in the top end surface of the stator 1 irrespective of the circumferential position (angle) of each securing projection 4b relative to the corresponding slit 4a.

Figure 6:
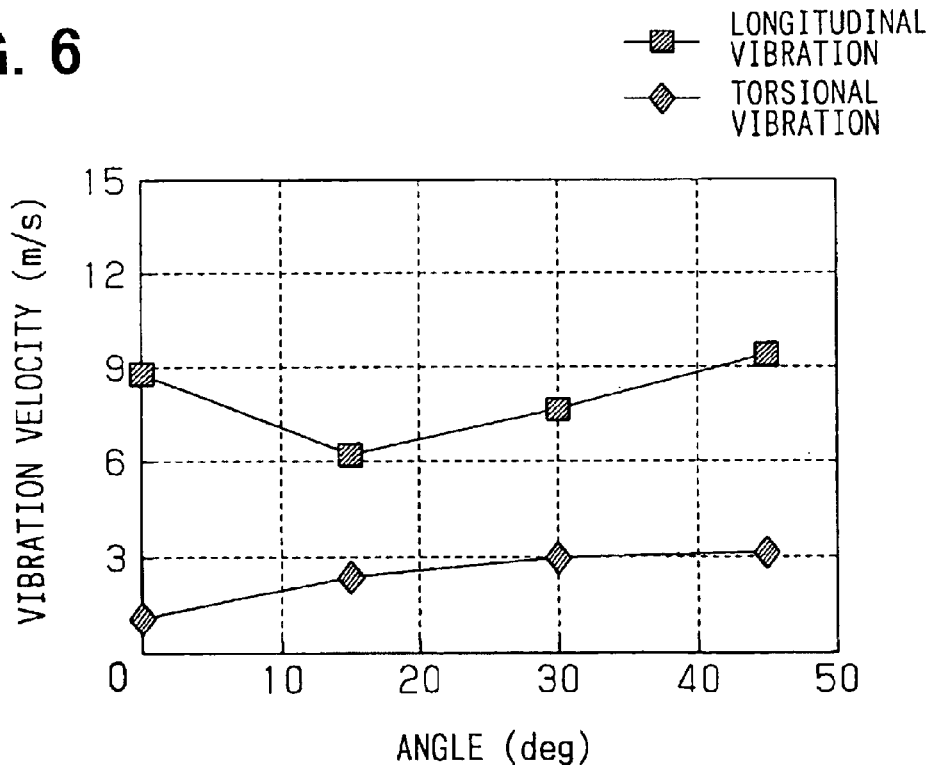
FIG. 6 is a graph showing a relationship between the circumferential position of the securing projection relative to the corresponding slit and a vibration velocity measured in a lower end of the securing projection of the ultrasonic motor.

FIG. 6 shows a result of an experiment for determining a relationship between the circumferential position (angle) of each securing projection 4b relative to the corresponding slit 4a and a corresponding vibration velocity measured in the lower end (the lower end surface) 4b2 of the securing projection 4b. This experiment is conducted while the lower end (the lower end surface) 1b of the stator 1 (the lower metal block 4) is placed on a flat plate, i.e., while the securing projections 4b are not supported by the external member or the like. As shown in FIG. 6, the longitudinal vibration generated in the lower end 4b2 of the securing projection 4b is minimized to about 6 m/second when the circumferential position (angle) of the securing projection 4b is 15 degrees. Because of this, in the ultrasonic motor of the present embodiment (FIGS. 1 and 2), the circumferential position (angle) of the securing projection is set to 15 degrees.

Next, results of experiments for determining a relationship between an axial position (height) of each securing projection 4b and a vibration velocity will be described with reference to FIGS. 3, 4, 7 and 8. The axial position (height) of the securing projection 4b is a height of the top end (top end surface) 4b1 of the securing projection 4b relative to the lower end 4a2 of the corresponding slit 4a in the vertical direction. That is, as shown in FIGS. 3 and 4, the securing projection 4b is placed in a reference height, i.e., zero point when the top end (the top end surface) 4b1 of the securing projection 4b coincides with the lower end 4a2 of the slit 4a in the vertical direction (the axial direction). Furthermore, these experiments are conducted while the circumferential position (angle) of each securing projection 4b relative to the corresponding slit 4a is held at 30 degrees (FIG. 4).

Figure 7:
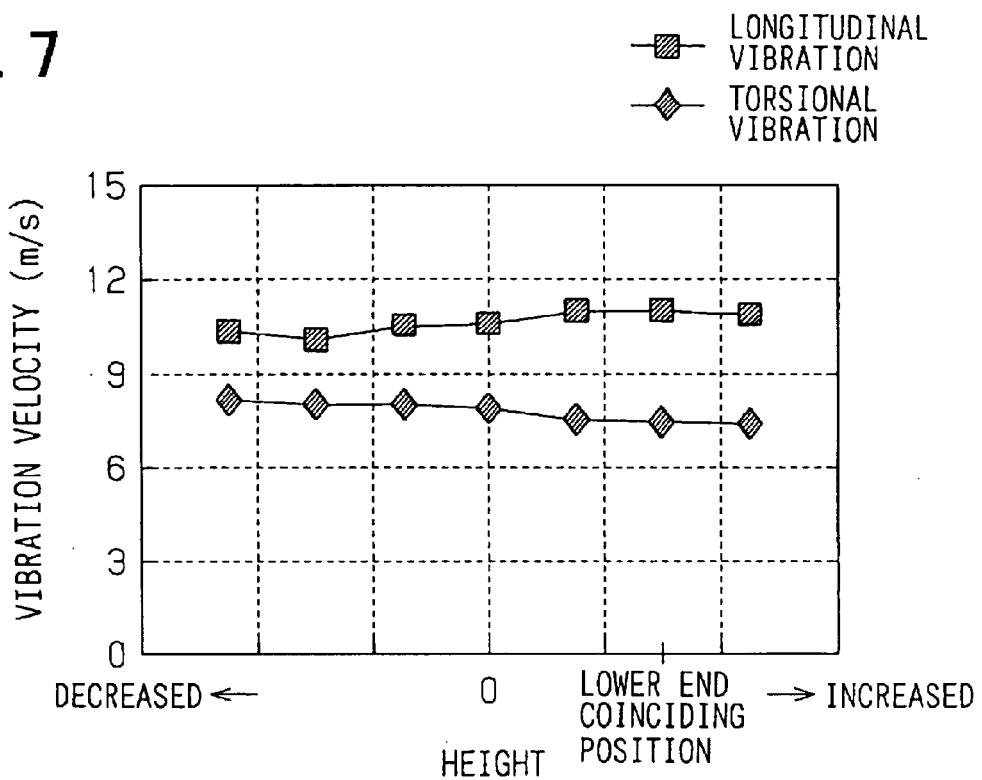
FIG. 7 is a graph showing a relationship between an axial position of the securing projection relative to the corresponding slit and a vibration velocity measured in the top end surface of the stator of the ultrasonic motor.

FIG. 7 shows a result of an experiment for determining a relationship between an axial position (height) of the securing projection 4b relative to the lower end 4a2 of the slit 4a and a corresponding vibration velocity measured in the top end surface of the stator 1 (i.e., in the contact surface of the stator 1 with the rotor 2). As shown in FIG. 7, the longitudinal vibration of a generally constant vibration velocity and the torsional vibration of a generally constant vibration velocity are generated in the top end surface of the stator 1 irrespective of the axial position of the securing projection 4b relative to the lower end 4a2 of the slit 4a.

Figure 8:
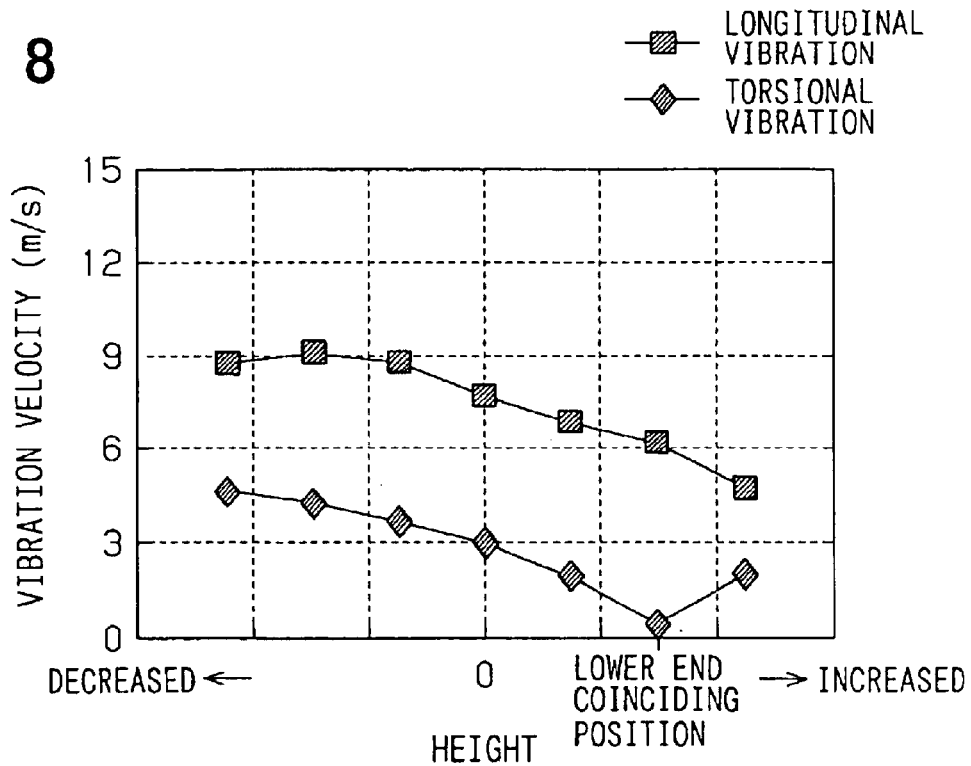
FIG. 8 is a graph showing a relationship between the axial position of the securing projection relative to the corresponding slit and a vibration velocity measured in the lower end of the securing projection of the ultrasonic motor.

FIG. 8 shows a result of an experiment for determining a relationship between the axial position (height) of the securing projection 4b relative to the lower end 4a2 of the slit 4a and a corresponding vibration velocity measured in the lower end (the lower end surface) 4b2 of the securing projection 4b. This experiment is conducted while the lower end (the lower end surface) 1b of the stator 1 (the lower metal block 4) is placed on the flat plate, i.e., while the securing projections 4b are not supported by the external member or the like. As shown in FIG. 8, the torsional vibration generated in the lower end 4b2 of the securing projection 4b is progressively reduced when the axial position (height) of the securing projection 4b is shifted toward a lower end coinciding position, in which the axial position of the lower end 4b2 of the securing projection 4b is substantially the same as the lower end 4a2 of the slit 4a, and the torsional vibration generated in the lower end 4b2 of the stationary projection 4b is minimized in the lower end coinciding position. Because of this, in the ultrasonic motor (FIGS. 1 and 2) of the present embodiment, the axial position (height) of each securing projection 4b is set to the lower end coinciding position.

Next, advantages of the above embodiment will be described.

(1) The eigenfrequencies (resonance frequencies) of each securing projection 4b are out of the drive frequency range (60–70 kHz) of the high frequency voltage, so that a vibration of each securing projection 4b is minimized at the time of driving the rotor 2. Furthermore, each securing projection 4b is positioned between the corresponding two of the slits 4a, which are circumferentially arranged, and the top end 4b1 of the securing projection 4b is positioned above the lower end 4a2 of the corresponding slit 4a. As described above, the vibration of the securing projection 4b is reduced when the axial position (height) of the securing projection 4b is shifted toward the lower end coinciding position. Thus, the vibration of each securing projection 4b is further reduced with the above arrangement. This allows a reduction in the vibration transmitted from each securing projection 4b to the external member, such as the motor case. Furthermore, the vibration of each securing projection 4b will less likely to interfere with the vibrations of the stator 1, so that more stable performance (higher efficiency and reduced fluctuation of the rotational speed) of the motor can be achieved.

(2) Each securing projection 4b is arranged such that the axial position (height) of the securing projection 4b is set to the lower end coinciding position, in which the axial position of the lower end 4b2 of the securing projection 4b is substantially the same as the lower end 4a2 of the corresponding slit 4a. With this arrangement, the vibration (torsional vibration) of each securing projection 4b can be further reduced, as indicated in FIG. 8.

(3) In the ultrasonic motor, the center X of each securing projection 4b is displaced by 15 degrees from the center Y of the lower end 4a2 of the corresponding slit 4a in the clockwise direction. With this arrangement, the vibration (longitudinal vibration) of each securing projection 4b can be further reduced, as indicated in FIG. 6.

The above embodiment can be modified as follows.

In the above embodiment, each securing projection 4b is arranged such that the axial position (height) of the securing projection 4b is set to the lower end coinciding position. However, the present invention is not limited to this. That is, as long as the top end 4b1 of each securing projection 4b is placed above the lower end 4a2 of the corresponding slit 4a, the axial position (height) of each securing projection 4b can be changed to any other appropriate axial position. Even with this modification, advantages similar to those discussed in the above sections (1) and (3) can be achieved.

In the above embodiment, the center X of each securing projection 4b is displaced by 15 degrees from the center Y of the lower end 4a2 of the corresponding slit 4a in the clockwise direction. However, the present invention is not limited to this. That is, as long as the top end 4b1 of each securing projection 4b is positioned above the lower end 4a2 of the corresponding slit 4a, the securing projection 4b can be placed at any other appropriate circumferential position (angle) between the corresponding two of the slits 4a. Even with this modification, the advantages similar to those discussed in the above sections (1) and (2) can be achieved.

In the above embodiment, the number of the slits 4a is six. However, the number of the slits 4a can be changed to any other appropriate number (e.g., nine). In such a case, the circumferential position (angle) and the axial position (height) of each securing projection 4b can be modified in any appropriate manner based on experiments similar to those discussed above to reduce the vibration of each securing projection 4b in the ultrasonic motor.

In the above embodiment, the number of piezoelectric elements (the first and second piezoelectric elements 5, 6) is two. However, the number of the piezoelectric elements can be reduced to one or can be increased to three or more.

In the above embodiment, the present invention is embodied in the ultrasonic motor, which rotates in both directions (i.e., the first rotational direction and the second rotational direction). However, the present invention can be equally applicable to the ultrasonic motor, which rotates in only one of the two directions. Furthermore, it should be noted that the ultrasonic motor discussed above can be used to rotate in only one of the two directions depending on its usage.

Additional advantages and modifications will readily occur to those skilled in the art. The invention in its broader terms is therefore not limited to the illustrated specific details.

What is claimed is:

1. An ultrasonic motor comprising:
    a generally cylindrical stator that has first and second axial ends and includes:
        at least one piezoelectric element that generates a longitudinal vibration upon application of a high frequency voltage to the at least one piezoelectric element; and
        a plurality of metal blocks that are connected to the at least one piezoelectric element, wherein one of the metal blocks includes:
            a plurality of vibration converting portions that generate a torsional vibration in response to the longitudinal vibration and are arranged in an outer peripheral surface of the one of the metal blocks at generally equal angular intervals, wherein each vibration converting portion has first and second axial ends, which are opposed to one another in a direction generally parallel to an axial direction of the stator and are oriented toward the first and second axial ends, respectively, of the stator; and
            a plurality of securing projections that engage with an external member and are arranged in the outer peripheral surface of the one of the metal blocks at generally equal angular intervals, wherein each securing projection is circumferentially located between corresponding two of the vibration converting portions and has first and second axial ends, which are opposed to one another in a direction generally parallel to the axial direction of the stator and are oriented toward the first and second axial ends, respectively, of the stator, and the first axial end of each securing projection is axially positioned within an axial extent of the vibration converting portions, which is measured in the axial direction of the stator, in such a manner that the first axial end of the securing projection is axially spaced away from one axial end of the axial extent of the vibration converting portions, at which the second axial ends of the vibration converting portions are located; and
    a generally cylindrical rotor that is slidably and rotatably urged against the stator, wherein the rotor is rotated upon application of the longitudinal vibration and the torsional vibration to the rotor.

2. The ultrasonic motor according to claim 1, wherein each securing projection has at least one eigenfrequency, and each of the at least one eigenfrequency of each securing projection is out of a drive frequency range of the high frequency voltage.

3. The ultrasonic motor according to claim 2, wherein:
    the drive frequency range of the high frequency voltage includes a frequency range from a first resonance frequency to a second resonance frequency;
    the first resonance frequency is a frequency for driving the rotor in a first rotational direction; and
    the second resonance frequency is a frequency for driving the rotor in a second rotational direction, which is opposite from the first rotational direction.

4. The ultrasonic motor according to claim 3, wherein the drive frequency range of the high frequency voltage further includes a variation range of the first resonance frequency and a variation range of the second resonance frequency.

5. The ultrasonic motor according to claim 1, wherein the second axial end of each securing projection is axially positioned at the one axial end of the axial extent of the vibration converting portions, at which the second axial ends of the vibration converting portions are located.

6. The ultrasonic motor according to claim 5, wherein each securing projection is circumferentially spaced away from both the corresponding two of the vibration converting portions.

7. The ultrasonic motor according to claim 6, wherein a circumferential center of each securing projection is circumferentially displaced by 15 degrees from a circumferential center of the second axial end of one of the corresponding two of the vibration converting portions.

8. The ultrasonic motor according to claim 7, wherein:
    each vibration converting portion is tilted relative to a direction parallel to the axial direction of the stator in such a manner that the second axial end of the vibration converting portion is circumferentially displaced from the first axial end of the vibration converting portion; and
    each securing projection is circumferentially closer to the second axial end of the one of the corresponding two of the vibration converting portions than the first axial end of the one of the corresponding two of the vibration converting portions.

9. The ultrasonic motor according to claim 1, wherein each vibration converting portion is in a form of a recess, which is recessed radially inward in the outer peripheral surface of the one of the metal blocks.

10. The ultrasonic motor according to claim 1, wherein each securing projection is axially positioned in a node of a wave of the torsional vibration.

* * * * *

UNITED STATES PATENT AND TRADEMARK OFFICE
CERTIFICATE OF CORRECTION

PATENT NO. : 6,882,085 B2
DATED : April 19, 2005
INVENTOR(S) : Masahiko Komoda et al.

It is certified that error appears in the above-identified patent and that said Letters Patent is hereby corrected as shown below:

<u>Title page,</u>
Item [75], Inventors, should read -- Masahiko Komoda, Toyokawa (JP); Motoyasu Yano, Kosai (JP); Yukihiro Matsushita, Hamakita (JP); --

Signed and Sealed this

Nineteenth Day of July, 2005

JON W. DUDAS
*Director of the United States Patent and Trademark Office*